United States Patent Office 3,468,867
Patented Sept. 23, 1969

3,468,867
CATALYTIC COMPOSITIONS FOR BUTADIENE POLYMERIZATION AND PROCESSES USING SAID COMPOSITIONS
Walter Marconi, Alessandro Mazzei, and Gabriele Lugli, San Donato Milanese, Milan, Italy, assignors to SNAM S.p.A., Milan, Italy, a company of Italy
No Drawing. Continuation of application Ser. No. 494,874, Oct. 11, 1965. This application Nov. 8, 1968, Ser. No. 774,549
Claims priority, application Italy, Feb. 3, 1965, 887/65
The portion of the term of the patent subequent to Sept. 16, 1986, has been disclaimed
Int. Cl. C08d 1/14, 3/08
U.S. Cl. 260—94.3       5 Claims

ABSTRACT OF THE DISCLOSURE

For polymerizing butadiene to produce polymers of essentially 1,4 cis structure, a linear polymeric compound of aluminum of polyiminic nature is used having repeating units of the type:

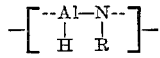

where R is an aryl, alkyl, or cycloalkyl hydrocarbon radical. With such a compound is mixed a compound of a transition metal of the IV to VIII group of the periodic system, and preferably an aluminum halide. The polymerization is carried out in the presence of an aromatic hydrocarbon solvent at a temperature between —30° C. and +100° C. and at a pressure between 1 and 20 atmospheres.

---

This is a continuation of Ser. No. 494,874, filed Oct. 11, 1965, now abandoned.

The present invention relates to new catalytic compositions and to butadiene polymerization processes using said compositions.

Diene polymerization is generally known from Belgian Patent No. 551,851 using catalytic systems comprising organo-metallic compounds together with compounds of transition metals. In the case of butadiene such systems can yield a polymer having a high content of 1,4 cis units.

Catalyst compositions are also provided in said patent containing hydride compounds together with compounds of transition metals capable, in the case of butadiene, of yielding structures having 1,2 or 1,4 trans linkages, depending on the used transition metal. Accordingly, the use of TiCl₄ together with hydrides yields 1,2 structures, while the use of TiI₄ in place of TiCl₄ yields 1,4 trans structures. The latter structure can also be obtained according to another Phillips patent (U.S. Patent 3,066,129) using TiCl₄ together with I₂.

The state of the art is sufficiently illustrated in "Linear and Stereoregular Addition Polymers" published by Interscience, 1959, page 138, lines 7 to 18.

We have now found that it is possible to obtain 1,4 cis polybutadiene using a linear polymeric compound of aluminum of polyiminic nature, containing in its molecule repeating units of the type

where R is an aryl, alkyl or cycloalkyl hydrocarbon radical.

Said compounds can be easily prepared by reacting LiAlH₄ with amine hydrochlorides or by reacting AlH₃ with primary amines:

nR—NH₂.HCl + nLiAlH₄ ⟶

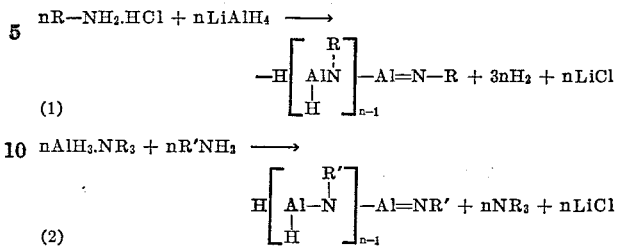

where R and R', identical or different, are groups selected from aryl, alkyl or cycloalkyl hydrocarbon radicals such as, for example, CH₃, C₂H₅, nC₄H', C₆H₅ and the like.

Said compounds will also be called in the course of this specification as "aluminum iminic polymers."

The preparation of said compounds is described by E. Wilberg, A. May in Z. für Naturforsch. 106, 232 (1955) and more particularly by R. Ehrlich and coll. in Inorg. Chem. 3, 628 (1964). Molecular weight measurements show them to be polymers in which $n$ is 4.

When $n$ is small (from 4 to about 50), such compounds are soluble in aromatic solvents and sometimes also aliphatic solvents. Higher molecular weight compounds are insoluble in common solvents, although they are still efficient catalysts in the presence of TiCl₄, for example, since they still contain an equivalent of active hydrogen for each aluminum atom. Such compounds have the advantage, especially with respect to the alkyl aluminum compounds used conventionally of greater stability towards oxidizing and hydrolizing agents and of greater safety in handling. Together with said aluminum iminic polymers, transition metal compounds are used selected from: titanium trichloride, titanium tetrachloride, titanium tetraiodide, vanadium trichloride, vanadium tetrachloride, nickel chloride, vanadium oxychloride, cobalt chloride, cobalt acetylacetonate and the like.

According to the present invention, together with the previously defined iminic aluminum polymer and with the transition metal compound also a third component is normally used which is an aluminum halide selected from aluminium iodide, chloride or bromide.

The selection of the aluminum halide is a function of the particular transition metal compound being used in the polymerization process, so, for example, in the case of cobalt compounds either aluminum chloride or bromide or iodide can be used, aluminum chloride being though the preferred one; in the cae of titanium compounds, on the other hand, if they contain iodide ions any aluminum halide can be used or it can also be absent, in which case the catalytic composition of the present invention will consist of a binary composition comprising only the aluminum iminic polymer and the titanium compound.

If, on the other hand, iodine is absent in the latter, as is the case of the other titanium halides or, for example, of the alkoxy compounds having the formula Ti(OR)₄ (where R is a hydrocarbon radical), the aluminum halide to be used is the iodide one or a mixture of aluminum halides comprising the iodide.

The operative conditions for the use of the catalytic compositions of the present invention in the case of butadiene polymerization to a substantially 1,4 cis polymer, comprise temperatures ranging from −30° to +100° C. and pressures from atmospheric to 20 atm.

Solvents which can be used are of hydrocarbon nature and comprise aliphatic, aromatic and cycloaliphatic hydrocarbons.

Examples of preferred solvents are benzene, toluene, n-heptane, n-octane, their isomers, and mixtures thereof.

EXAMPLES 1–3

5 g. of LiAlH$_4$ (0.132 mole) and 130 cm.$^3$ of anhydrous benzene are charged to a two neck flask provided with a reflux condenser. To the stirred suspension 9.45 g. of ethylamine hydrochloride (0.166 mole) are added over a period of about 30 minutes at room temperature.

The mixture is kept at 50° for 16 hours and at room temperature for further 35 hours. The mixture is filtered under nitrogen and a solution is obtained which when analysed gave the following results:

Al=2.25 g./100 cm.$^3$; N=1.35 g./100 cm.$^3$; Cl=0.10 g./100 cm.$^3$;

H (active)=1620 cm.$^3$/100 cm.$^3$ which correspond with a good approximation to the empirical formula:

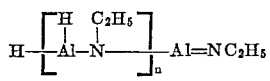

Such solution will be called solution A.

We have carried out butadiene polymerization runs with the catalyst obtained mixing in convenient ratios solution A with a toluenic solution of TiCl$_4$ and a toluenic solution of AlI$_3$. The polymerization runs were carried out in drinking bottles of 200 cm.$^3$ capacity, introducing in succession 100 cm.$^3$ of anhydrous toluene, the desired quantity of solution A, 2.29 cm.$^3$ of a 0.105 molar toluenic solution of AlI$_3$. The bottle was closed with a neoprene plug and a bored crown cap through which 15 g. of butadiene were introduced, using a hypodermic needle welded to the butadiene cylinder.

Finally 1 cm.$^3$ of a 0.2275 molar TiCl$_4$ toluenic solution was introduced by means of a hypodermic syringe, under stirring.

The bottles were kept inside a rotating thermostatic bath at the desired temperature and for the desired time. At the end, the bottles were opened and their content poured in methyl alcohol containing an antioxidizer. The coagulated solid polymer was kept in an oven under vacuum at 45° C. until constant weight was reached. On the dry polymer the yield was calculated and infrared analysis and the measurement of intrinsic viscosity in toluene at 30° C. were made.

The polymerization conditions and the obtained results are shown in Table 1.

TABLE 1*

| Run Number | $\begin{bmatrix} H & C_2H_5 \\ | & | \\ Al=N \end{bmatrix}_n$ Solution A (cm.$^3$) | Atomic Ratio H (active)/Ti | Polymerization Temperature, °C. | Polymerization Time, Hr. | Solid Polymer yield, Gram Percent | IR Analysis, Percent | | | |
|---|---|---|---|---|---|---|---|---|---|
| | | | | | | 1,4 cis | 1,4 trans | 1,2 | |
| 1 | 0.82 | 3 | +5 | 2 | 100 | 93 | 2.5 | 4.5 | 2.73 |
| 2 | 1.1 | 4 | +5 | 2 | 100 | 92.3 | 3.5 | 4.2 | 2.15 |
| 3 | 1.37 | 5 | +5 | 2 | 92 | 93.5 | 2.3 | 4.2 | 1.59 |

*TiCl$_4$, 2.275 mmoles; AlI$_3$, 2.275 mmoles; toluene, 100 cm.$^3$; butadiene, 15 g.

EXAMPLES 4–5

Butadiene was polymerized with a catalytic system made up by the aluminum iminic polymer (the previously described solution A) and by TiI$_2$Cl$_2$ having two different ratios H (active)/Ti.

The polymerization procedures were the same as those described in the previous examples; the used quantities and obtained results are shown in Table 2.

TABLE 2*

| Example Number | $\begin{bmatrix} H_2 & C_2H_5 \\ | & | \\ Al=N \end{bmatrix}_n$ Solution A (cm.$^3$) | TiI$_2$Cl$_2$ mmoles | Atomic ratio H (active)/Ti | Polym. temp., °C. | Polym. time, Hr. | Solid polymer yield, gram percent | IR Analysis, percent | | |
|---|---|---|---|---|---|---|---|---|---|
| | | | | | | | 1,4 cis | 1,4 trans | |
| 4 | 0.82 | 2.275 | 3 | +5 | 2.5 | 73 | 94 | 2 | |
| 5 | 1.1 | 2.275 | 4 | +5 | 2.5 | 88 | 93 | 3 | |

*Toluene, 100 cm.$^3$; butadiene, 15 g.

EXAMPLE 6–7

Butadiene was polymerized with a three components catalytic system made up by the previously described solution A compound, cobalt diacetylacetonate, and AlBr$_3$.

Operating procedures were similar to those previously described, i.e. 100 cm.$^3$ of toluene, the desired quantity of solution A, the desired quantity of AlBr$_3$ as toluene solution, butadiene and finally the toluenic solution of CoA$_2$(A=acetylacetone) were introduced in succession into the reaction vessel. The used quantities, polymerization conditions and obtained results are shown in Table 3.

TABLE 3*

| Example Number | Solution A, cm.$^3$ | CoA$_2$, mmoles | Atomic Ratio H (active)/Co | Molar Ratio AlBr$_3$/CoA$_2$ | Solid polymer yield, gram percent | IR Analysis, percent | | | AlBr$_3$, mmoles |
|---|---|---|---|---|---|---|---|---|---|
| | | | | | | 1,4 cis | 1,4 trans | 1,2 percent | |
| 6 | 2.13 | 0.0059 | 300 | 250 | 90 | 95 | 3 | 2 | 1.47 |
| 7 | 1.42 | 0.0059 | 200 | 166 | 60 | 94.5 | 3 | 2.5 | 0.98 |

*Toluene, 100 cm.$^3$; butadiene, 15 g.; polymerization temperature, +2° C.; polymerization time, 5 hours; CoA$_2$=cobalt acetylacetonate.

EXAMPLE 8

Butadiene was polymerized with a three component catalytic system made up by the n-butyl-iminic polymer, cobalt diacetyl-acetonate and aluminum bromide.

The aluminum iminic polymer is prepared by reacting in a two neck flask, provided with a reflux condenser and a stirrer, 8.2 g. of LiAlH$_4$ (0.215 mole) in 200 cm.$^3$ of anhydrous toluene and 17.7 g. (0.195 mole) of n-butylamine hydrochloride. The mixture is stirred at 50° C. for 3 hours and then at room temperature for 70 hours.

The mixture is filtered and the limpid solution is concentrated under vacuum to about two-thirds if its initial volume. This solution is analyzed: Al=2.58 g./100 cm.³ of solution; N=1.40 g./100 cm.³, H(active)=2558 cm.³/100 cm.³; Cl=absent.

The analysis corresponds, with good approximation, to an empirical formula $$-\left[\begin{array}{c}H\\|\\Al-N\\|\\n.C_4H_9\end{array}\right]_n -Al=N-n.C_4H_9$$

Such solution is referred to as solution B.

The butadiene polymerization recipe is as follows:

Toluene—100 cm.³.
Solution B—1.85 cm.³ (corresponding to $1.77 \times 10^{-3}$ g.-atom of aluminum.
AlBr—1.47 mmoles.
CoA₂—0.0059 mmole.
Butadiene—16 g.

The atomic ratio H(active)/Co is 300 and the molar ratio AlBr₃/CoA₂ is 250.

The operating procedures were similar to the ones described in Examples 6 and 7.

Polymerization was carried out at +2° C. for 60 hours.

10.6 g. of dry polymer were obtained (yield=66%), which showed the following composition at IR analysis: 94.5% 1,4 cis; 2.5% 1,4 trans; 3% 1,2.

EXAMPLE 9

Aluminum phenyl iminic polymer was synthesized in a 500 cm.³ capacity two neck flask provided with a reflux condenser and a stirrer by reacting: 7.1 g. of LiAlH₄ (0.187 mole) in 170 cm.³ of toluene with 13.1 g. of aniline hydrochloride (0.168 mole). The reaction was carried out under stirring for 75 hours at room temperature and eventually heating to 50° C. for 8 hours. The mixture was filtered under nitrogen and the limpid solution was concentrated under vacuum to about 20% of its initial volume.

Analyses were carried out on the limpid solution. The results were: Al=0.719 g./100 cm.³ of solution, $$\frac{\text{gram atoms N}}{\text{gram atoms Al}}=1.2 \text{ and } \frac{\text{gram atoms H (active)}}{\text{gram atoms Al}}=1.17$$

Cl=absent which corresponds, with approximation, to a formula of the following type:

$$H-\left[\begin{array}{c}H\\|\\Al-N\\|\\C_6H_5\end{array}\right]_n -Al=N-C_6H_5$$

Such solution is referred to as solution C.

Butadiene was polymerized with a catalytic system made up by TiCl₄, AlI₃ and solution C with established ratios between the components.

The recipe is:

Toluene—100 cm.³.
Solution C—3.42 cm.³ (corresponding to $0.91 \times 10^3$ g.-atoms of Al).
AlI₃—0.2275 mmole.
TiCl₄—0.2275 mmole.
Butadiene—20 g.

The operating procedures were as those described in Example 1.

Polymerization was carried out at 10° C. during 2 hours.

18.5 g. of dry polymer were obtained with a yield of 92%.

IR analysis gave the following composition: 91.5% 1,4 cis; 3.5% 1,4 trans; 5% 1,2.

EXAMPLE 10

Butadiene was polymerized with a catalytic system made up from the compound of the previously described solution C and TiI₂Cl₂.

The recipe is as follows:

Toluene—100 cm.³.
Solution C—1.83 cm.³ (corresponding to 0.488 milliatom Al).
TiI₂Cl₂—0.162 millimole.
Butadiene—20 g.
Polymerization temperature—5° C.
Polymerization time—2.5 hours.

The results of the run are: solid dry polymer 17.8 g. corresponding to a yield of 88%; IR analysis of polymers: 94% 1,4 cis; 2% 1,4 trans; 4% 1,2.

We claim:
1. A process for polymerizing butadiene to substantially 1,4 cis polybutadiene comprising contacting butadiene with a catalyst system obtained by combining:
   a compound of a transition metal selected from the group consisting of titanium trichloride, titanium tetrachloride, vanadium tetrachloride, nickel chloride, vanadium oxychloride, cobalt chloride and cobalt acetylacetonate and
   a polyiminoalane represented by the formula:

$$H-\left[\begin{array}{c}Al-N\\|\ \ |\\H\ \ R\end{array}\right]_n -Al=N-R$$

wherein
   R is an alkyl, aryl, or cycloalkyl radical and n is from 4 to about 50
in an aromatic hydrocarbon solvent
and carrying out the polymerization reaction at temperatures between −30 and +100° C. and at pressures between 1 and 50 atm. so that a polymer is obtained having a content of more than 90% of 1,4 cis units.

2. A process according to claim 1 wherein the transition metal compound is a titanium halide containing iodine.

3. A process according to claim 1 wherein the transition metal is a titanium halide chosen among TiCl₄ and TiBr₄ and the catalyst system includes a third component selected from the group consisting of iodine and inorganic iodides.

4. A process according to claim 1 wherein the transition metal compound is a cobalt compound and the catalyst system includes a third component selected from the group consisting of aluminum chloride, aluminum bromide and aluminum iodide.

5. A catalytic composition comprising the reaction product of a compound of a transition metal selected from the group consisting of titanium tetrachloride, titanium tetrabromide, titanium tetraiodide, vanadium trichloride, zirconium tetrachloride, cobalt chloride, cobalt acetylacetonate, manganese chloride and nickel chloride with a polyiminoalane represented by the formula:

$$H-\left[\begin{array}{c}Al-N\\|\ \ |\\H\ \ R\end{array}\right]_n -Al=N-R$$

wherein
   R is an alkyl, aryl or cycloalkyl radical and n is from 4 to about 50.

(References on following page)

References Cited

UNITED STATES PATENTS

| | | | |
|---|---|---|---|
| 3,163,611 | 12/1964 | Anderson et al. | 252—429 |
| 3,178,402 | 4/1965 | Smith et al. | 260—94.2 |
| 3,255,169 | 6/1966 | Kearby | 260—93.7 |

JAMES A. SEIDLECK, Primary Examiner

R. A. GAITHER, Assistant Examiner

U.S. Cl. X.R.

252—431, 438, 429, 428; 260—94.6